Patented June 16, 1925.

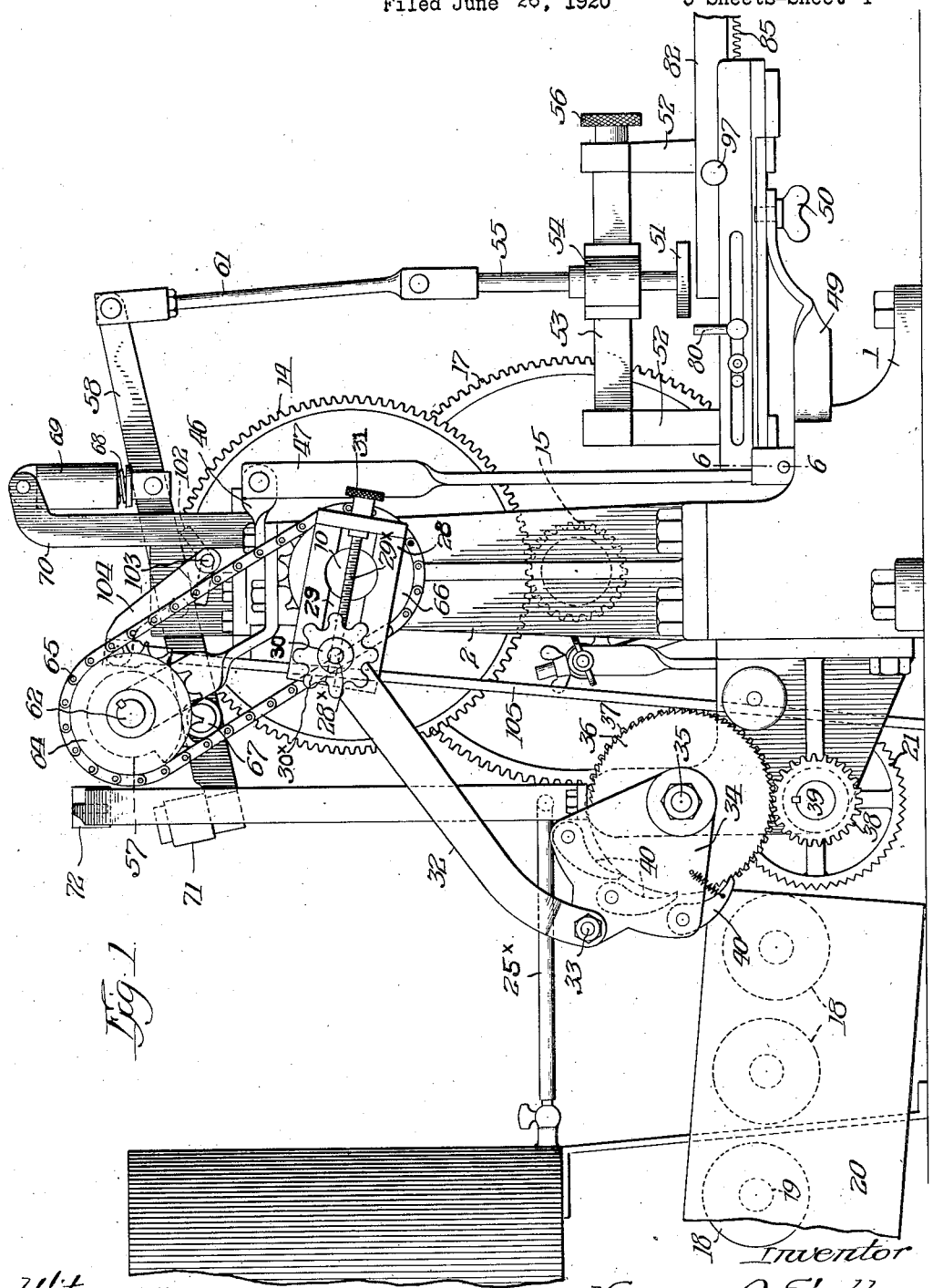

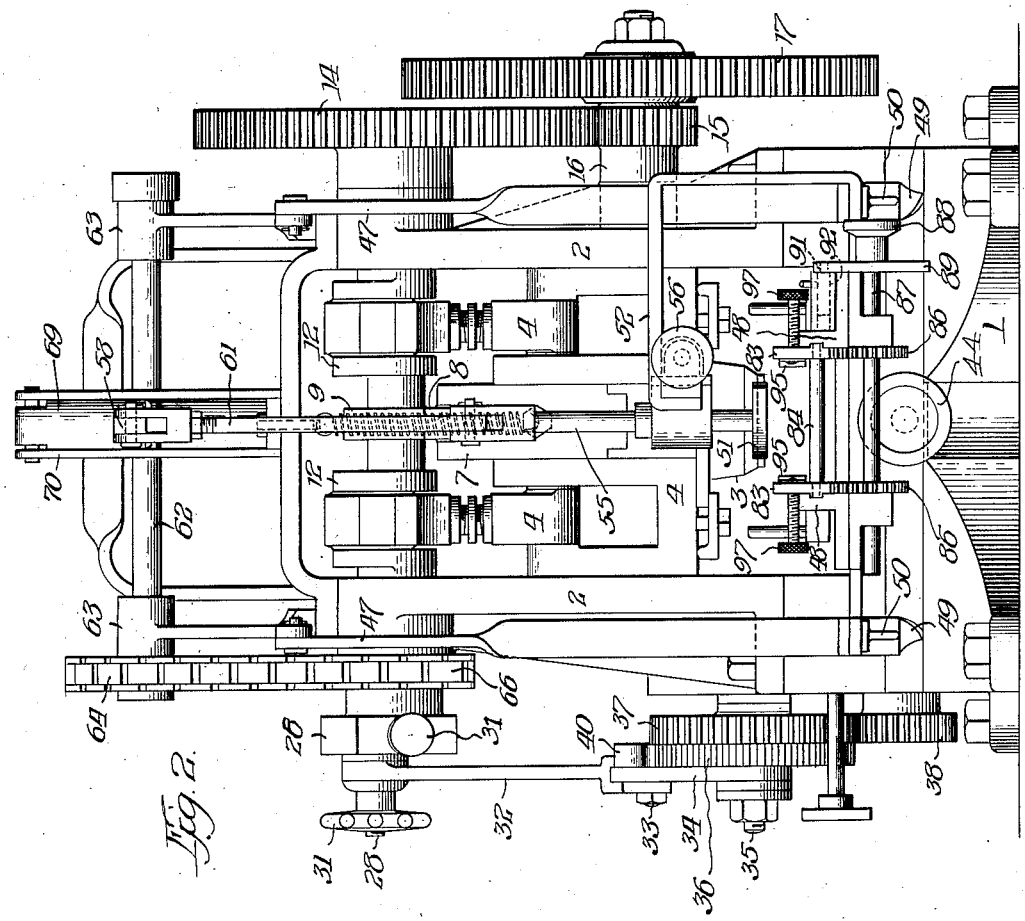

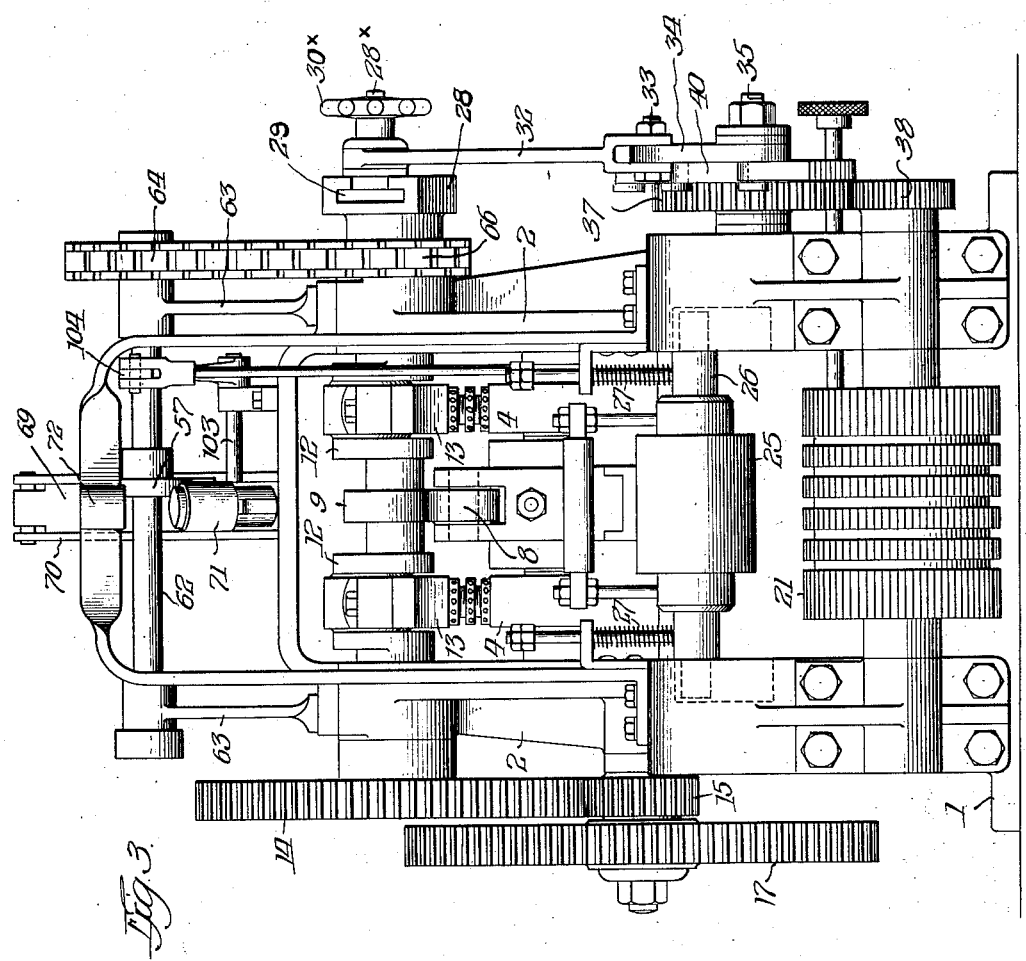

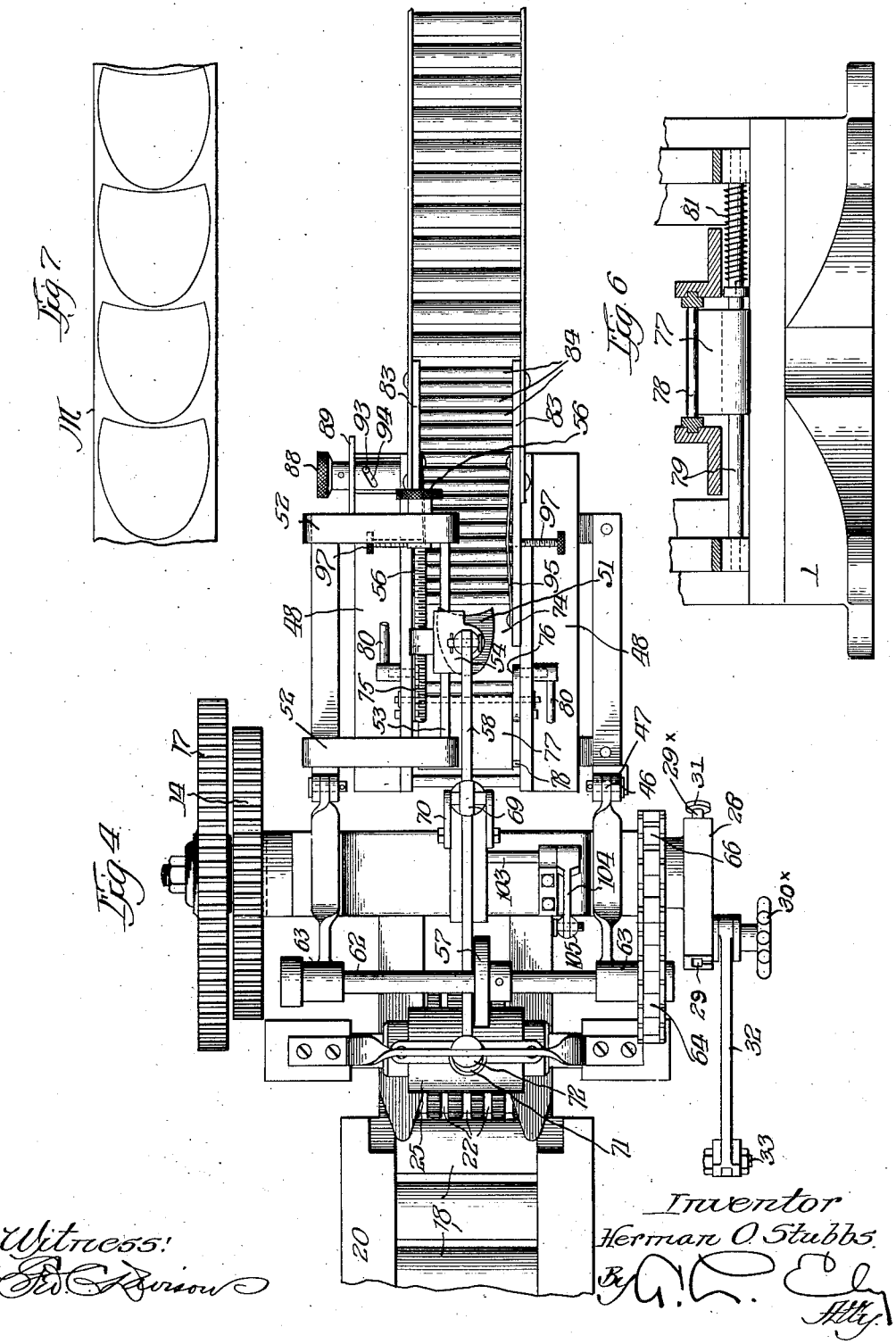

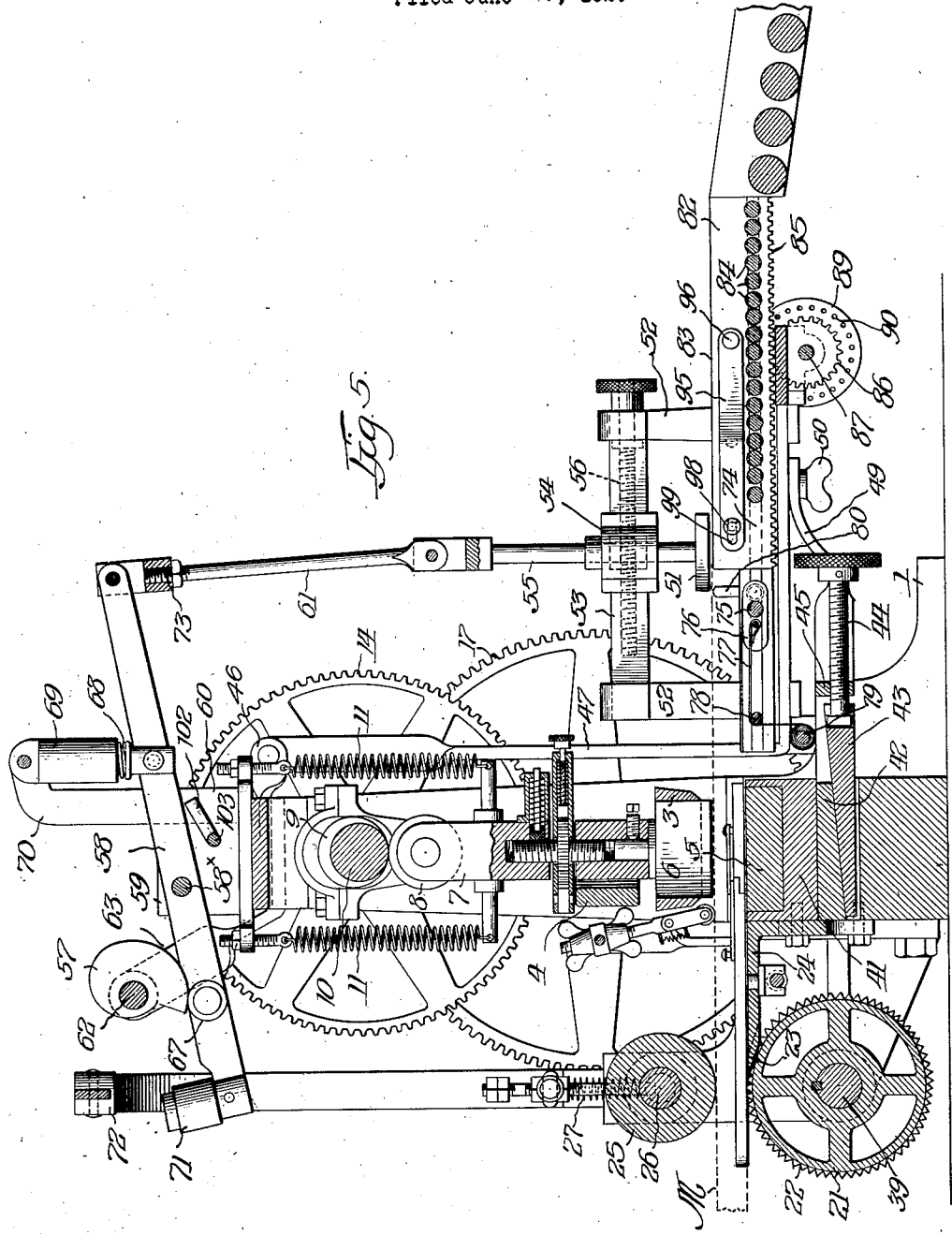

1,542,422

UNITED STATES PATENT OFFICE.

HERMAN O. STUBBS, OF AKRON, OHIO, ASSIGNOR TO THE FIRESTONE TIRE AND RUBBER COMPANY, OF AKRON, OHIO, A CORPORATION OF OHIO.

RUBBER-PUNCHING MACHINE.

Application filed June 26, 1920. Serial No. 391,941.

*To all whom it may concern:*

Be it known that I, HERMAN O. STUBBS, a citizen of the United States, residing at Akron, in the county of Summit and State of Ohio, have invented certain new and useful Improvements in Rubber-Punching Machines, of which the following is a specification.

This invention relates to a machine for the purpose of cutting or punching out blanks of fixed sizes, and is particularly intended for use in cutting out blanks of uncured or unvulcanized rubber. While it is shown as especially designed for the purpose of cutting out pieces of unvulcanized rubber for rubber heel manufacture, it may be used for other purposes as will be apparent.

One of the objects of my invention is to provide a novel plunger or knock-out device, by which, at the completion of the cutting operation, the blank thus cut is knocked or forced from the strip of material.

With this invention, therefore, the successive blanks are punched in a strip of rubber, which is automatically fed through the machine under the cutting die, and the blanks are freed from the strip, and there is no necessity of any subsequent hand freeing in the blanks after they have been punched in the machine. My improved device for freeing the blanks from a strip of elastic material is adjustable to allow for different sizes of blanks. Another object of my invention is to provide a novel table or support for carrying the material as it comes from the machines, in which there is an adjustable aperture through which the blanks may be pushed in freeing them from the strips, said aperture being adjustable to make allowance for blanks of varying sizes.

In the application of Harvey F. Maranville and Horace D. Stevens, Serial No. 328,988, on rubber punching machines, which has since matured into Patent No. 1,394,422 of October 18, 1921, and to which reference should be had for a further understanding, a mechanism is illustrated and described for cutting or punching blanks from a strip of unvulcanized or elastic material, which mechanism is intended to feed the material intermittently and to punch a blank from said strip during each pause in the feeding of the strip. A device for supplying a film of water over the material is also shown. I have chosen to use the same mechanism for feeding the material and punching out the blanks and have, by means of suitable connections, made use of the feed operating crank shaft for actuating my improved device.

In combination with the device herein illustrated for forcing the blank from the strip of material there is provided a means for rendering it inoperative, as is required when the machine is not cutting or feeding properly at the beginning or end of the strip.

In order to give an understanding of my invention, I have illustrated in the drawings a selected embodiment thereof which will now be described, after which the novel features will be pointed out in the appended claims.

Fig. 1 is a side view of a portion of a punching machine having my improvements applied thereto.

Fig. 2 is a front view thereof.

Fig. 3 is a rear view of Fig. 1.

Fig. 4 is a plan view thereof.

Fig. 5 is a sectional view taken longitudinally of the machine.

Fig. 6 is a view taken on line 6—6, Fig. 1.

Fig. 7 is a fragmentary view of a strip of material showing the manner in which the blanks are cut from the stock.

Since my invention relates to a mechanism for removing the cut blanks from a strip of material, I have deemed it necessary to illustrate and describe in detail only a sufficient portion of the machine to enable the invention to be understood.

1 indicates the bed plate of the machine from which rises a pair of standards or side brackets 2 carrying the cutting mechanism, which is in the form of a die 3 that is carried by a reciprocating yoke 4. The bed plate 1 supports a cutting block 5 over which the material is fed. The material M, which in this selected machine is in the form of a strip, is compressed at the time the cutting die is operating by means of a plunger 6 reciprocable in the center of the die 3 and carried by an adjustable cam operated arm 7. The cutting die carrier is slidably received in a suitable guideway in the side of the uprights 2 and is arranged to cut a single blank at each stroke, although the number may be increased if desired.

The arm 7 carries at its upper end a roll 8 in contact with a cam 9, on the main drive shaft 10 which is rotatably mounted in bearings at the upper ends of the uprights 2, said roller 8 being held in contact with the cam by a pair of helical springs 11. The shaft 10 is provided with offset portions 12 forming bearings for the eccentric cranks 13 which are connected to the die supporting yoke 4. One end of the shaft 10 carries a gear 14 in mesh with a pinion 15 on a stub shaft 16 projecting from the side of the housing 1 and supporting another gear 17 from which the machine is operated by any suitable source of power.

At the rear of the bed plate 1 is positioned a plurality of rollers 18 for the purpose of guiding the strips of rubber into the machine, said rollers being journaled on shafts 19 between the sides of a framework 20.

Centrally located between the die plate 5 and the frame 20 is rotatably mounted a feed roll 21, the outer surface of which is serrated or corrugated to grip the under side of the rubber strip, said roll being provided with a plurality of grooves 22, into which are received stripping fingers 23 projecting rearwardly from a table 24 adjustably mounted on the rear of the bed plate 1. Above the feed roll 21 is mounted a pressure roll 25 carried by the shaft 26 and yieldably held down by springs 27. Playing on the roll 25 is a stream of water supplied from a tank through a flexible pipe 25˟. By this means the upper surface of the rubber strip is covered with a film of water, which enables the die parts of the machine to cut out the blanks as required.

The feeding of the rubber is accomplished by means of a rotating crank 28 carried upon the end of the main shaft 10. In order to provide for an adjustable feed of the rubber strips, the crank arm is formed with a slot 29 in which is carried a slide 30 supporting the crank pin 28˟. Adjustment of the slide is obtained by a screw shaft 29˟ carrying a thumb nut 31, and the locking of the slide in any position is done by a hand nut 30˟.

The pitman is indicated by the numeral 32 and is pivotally connected at 33 to a rocking fan-shaped sector 34, which is pivoted on a stub shaft 35, projecting from the bed plate 1. Also mounted on the stub shaft 35 is a ratchet 36 to the rear face of which is secured a gear 37 in mesh with a gear 38 keyed to the shaft 39 of the feed wheel 21. Carried by the sector 34 is a plurality of pawls 40 which are so arranged as to fall at different points on the several ratchet teeth. This provides for a minute feed and prevents back lash, which, in combination with the adjustable throw of the crank-pin, assures an accurate feed for any size die.

Beneath the die is arranged the cutting block 5 seated in a holder 41 which rests on a pair of wedges 42 and 43 so that vertical adjustment may be obtained. The wedges are adjusted by means of a set screw 44, threaded into a plate 45 secured on the base 1.

From the upper ends of the standards 2 are extended a pair of lugs 46 from which are pivotally suspended hangers 47, the lower end of the hangers sustaining a pair of rails 48, between which is carried the blank knock-out device embodied in this invention. Extending from the front of the bed 1 is a pair of brackets 49, the outer ends forming a rest for the rails 48, and having thumb nuts 50 therein intended to lock the rails to the brackets 49. When it is desired to change or adjust the die, the nuts 50 are unscrewed and the hangers 47 are swung up about their pivots on the lugs 46, thus leaving the front of the machine clear and easily accessible.

Positioned above the strip of rubber at the outlet end of the machine is an oscillating plunger 51 carried on a vertical shaft or rod 55 which is operated at the same time with the die. The plunger is so placed that it will be directly over the center of a blank. Secured to one of the rails 48 by brackets 52 is a bar 53 having a head 54 slidable thereon, said head containing an aperture adapted to receive and guide the plunger rod 55. The head is adjusted longitudinally of the bar by a set screw 56 to make up for the difference in the size of various blanks, said set screw being attached to bracket 52 and passing through a boss formed in the side of the head 54. The plunger is operated through a cam 57 and a rocking arm 58 pivoted at 58˟ in a clevis 59 formed in a bracket 60 which is secured to the top of the standards 2, and a link connection 61 with the end of the arm 58. Cam 57 is journaled on a shaft 62 rotatable in supports 63 by a sprocket 64 and chain 65 from another sprocket 66 on the main drive shaft 10. The cam is engaged by a roller 67 on the rocking arm 58, said roller being held in contact by a compression spring 68 carried in a dash pot 69 from a lug 70. The rearward end of the arm 58 is formed with a bumper 71 which works in connection with a stop 72 to limit the downward thrust of the plunger 51. The plunger is adjustable vertically by a screw and nut connection 73.

It will be seen that when the plunger is used on different size blanks, it is adjusted by the screw 56 and in order to compensate for this variation in the sizes of the blanks, I have provided an adjustable aperture 74 in the material support at the outlet side of the machine through which the blanks are pushed from the strips of rubber. At the rear side of this aperture, slidable between the vertical edges of the rails 48, is a roller 75 each end of which is secured in a slide plate 76 movable along the vertical edges of the rails 48. Immediately behind the roller 75 there is connected to the plates 76 the front end of a curtain or belt 77 supported on a level with the roller 75 by a rod 78 at the inner end of the rails 48 adjacent the die. The free end of the curtain is wound on a spring roll 79, the spring 81 tending to keep the curtain taut between the rollers 78 and 75. The plates 76 are held in adjustment by set screws 80.

Between the rails 48, forward of the aperture 74, a sliding carriage 82 is mounted, said carriage comprising a pair of side rails 83 between which is suspended a plurality of rollers 84, the first roller forming the outer side of the aperture 74, intended to receive and support the rubber strip after the blanks have been punched therefrom. The sides 83 are provided with longitudinal ribs adapted to cooperate with complementary grooves formed in the rails 48, the ribs guiding the carriage in correct alignment. Also formed on the sides 83, at the bottom thereof, are racks 85 which are engaged by pinions 86 on a shaft 87 having on one end a hand wheel 88. The hand wheel is rotated when it is desired to move the carriage to decrease or enlarge the size of the aperture 74. Means for locking the pinions and carriage in a fixed position is shown in a disc 89 integral with the hand wheel 88, said disc being provided with a series of apertures 90 to receive the locking pin 91. The pin 91 is secured in a cylinder 92 so that it is movable transversely of the disc, the movement of said pin being controlled by a projecting stud 93 and an inclined slot 94 in the cylinder. To adjust the carriage 82, the stud 93 is moved rearwardly in the slot 94, thus withdrawing the locking pin 91 from the disc 89, and the hand wheel is rotated to operate the pinions 86 on the rack 85. To lock the shaft 87 from rotation, the locking pin is again placed in an aperture 90 in the disc 89. The strip of rubber is centered on the carriage by a pair of leaf springs 95 attached to the sides 83 by rivets 96 and expanded in the center by set screws 97 acting on the rear side, the loose ends of the springs being held on the sides 83 by studs 98 operating in slots in the springs 95. In order to render the plunger 51 ineffectual, there is provided a crank lug 102 on the end of a shaft 103. The shaft 103 carries a link 104 connected to a rod 105 that may be attached to any suitable depressing means, such as a foot treadle. The crank lug 102 operates forward of the pivot 58ˣ and when operated by the rod 105 it lifts the outer end of the rocking arm 58 up against the springs 68, thus lowering the roller 67 out of engagement with the plunger operating cam 57, and the machine may be operated without working the knock-out device.

The operation of this machine is simple and it efficiently accomplishes its functions with very little attention, even in the hands of an unskilled operative. The strip from which the blanks are to be punched is placed on the rollers 18, the forward ends being engaged by the feed roll 21 and pressure roller 25. The power is turned on and the feed roll is actuated intermittently by the rotation of the crank 28 and the pitman 32. As the strip passes under the roller 25, the upper surface receives a film of water which aids in the cutting of the rubber. The die operates between feeding strokes, the plunger 6 compressing the strip of rubber during the cutting of the blank. As the strip passes from under the die, the rubber springs back to its original thickness and the blank cut therein is confined by the expansion of the rubber and force has to be used to free the blank from the strip. For this purpose I have provided a mechanically operated plunger actuated above the strip at the outlet side of the machine. The plunger is fixed to operate at the same time with the die, as the strip is not feeding then. In the simple construction shown, the plunger is easily adjustable for blanks of various sizes, it being desired to have the plunger act on the central portion of the blank. The rollers upon which the strip rests when passing from the machine are provided with an adjustable break or aperture through which the blanks are pushed from the strip by the plunger 51. If the die is not cutting properly, or if the first or last cut in a strip is not a whole blank and it is desired to render the plunger 51 inoperative, the operator depresses the rod 105, thus raising the rocking arm out of contact with the plunger actuating cam 57.

It is to be understood that the mechanism described herein is illustrative of the preferred embodiment of the invention, but that it is in no way restrictive and that the invention contemplates the movement of any type of device adapted to push or force the cut blank from a strip of rubber.

I claim:

1. A machine for forming blanks from resilient material comprising in combination, a support for a moving strip of material, a die for cutting blanks from the strip, an ejector adapted to remove the blanks from the strip, and means for supporting the strip while the blanks are being removed adapted for forming a discharge opening for the blanks and for varying the size of the opening.

2. A machine of the character described comprising in combination, a support for a moving strip of material, a reciprocating die for cutting blanks from the strip, a reciprocating ejector for removing the blanks from the strip, and a common means for reciprocating the die and the ejector adapted for rendering the ejector inoperative without affecting the operation of the die.

3. A machine of the character described comprising in combination, a support for a moving strip of material, means for intermittently moving the strip over the support, a reciprocating die for cutting blanks from the strip, an ejector for forcing the blanks from the strip, means for supporting the strip during the ejecting operation adapted for forming an opening variable in size for discharging the blanks, and a common driving mechanism for the die and ejector adapted for rendering the ejector inoperative without affecting the action of the die.

4. A machine of the character described comprising in combination, a support for a moving strip of material, a die for cutting blanks from the strip, means for operating the die, a reciprocating ejector member for forcing the blanks from the strip, a rocking arm for reciprocating the ejector adapted for operation by the die operating means, and devices for adjusting the ejector in the path of movement of the strip.

5. A machine of the character described comprising in combination, a support for a moving strip of material, a die for cutting blanks from the strip, an ejector device adjustable along the path of the strip for forcing the blanks from the strip, and means for intermittently moving the strip and operating the die and ejector between movements of said strip.

6. A machine of the character described comprising in combination, a support for a moving strip of material, a die for cutting blanks from the strip, an ejector for removing the blanks from the strip, a rocking mechanism for operating the ejector, and means for supporting the strip during the ejecting operation adapted for forming a discharge opening for the blanks and for varying the size of the opening.

7. A machine of the character described comprising in combination, a support for a moving strip of material, a die for cutting blanks from the strip, an ejector for removing the blanks from the strip, means for intermittently moving the strip and operating the die and ejector between movements of the strip, and means for supporting the strip during the ejecting operation adapted for forming a discharge opening for the blanks and varying the size of the opening.

8. In a machine of the character set forth, the combination of a cutting block, a die operable over said block to cut blanks from rubber stock, an oscillating plunger adjacent said die intended to force the cut blanks from the material, and means for rendering the plunger inoperative without affecting the operation of the die.

9. In a machine of the character described, the combination of a die for cutting blanks from a strip of rubber stock, blank ejecting means outside said die for forcing the cut blanks from the stock, said means being adjustable in the direction of the feed of the stock to accommodate the ejecting means to different sizes of cutting dies.

10. In a machine of the character described, the combination of a support for the material, a die operable over said support for cutting blanks from the stock, means for feeding the material under the die, a table or support outside said die to receive the material, said table being provided with an adjustable aperture to accommodate blanks of different sizes, and a vertically operated plunger adapted to force the cut blanks from the material through said aperture.

11. In a machine of the character described, the combination of a cutting die, a feed out table having a discharge opening therein, and an ejector opposite the opening, one wall of said opening being shiftable to vary the size of the opening to accommodate it to blanks of different sizes.

HERMAN O. STUBBS.